(12) United States Patent
Kreh

(10) Patent No.: US 9,725,605 B2
(45) Date of Patent: *Aug. 8, 2017

(54) WATER-BASED EPOXY FORMULATIONS FOR APPLIED FIREPROOFING

(71) Applicant: United States Mineral Products Company, Stanhope, NJ (US)

(72) Inventor: Robert Paul Kreh, Middle River, MD (US)

(73) Assignee: United States Mineral Products Company, Stanhope, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/687,571

(22) Filed: Apr. 15, 2015

(65) Prior Publication Data

US 2015/0291809 A1  Oct. 15, 2015

Related U.S. Application Data

(60) Provisional application No. 61/979,802, filed on Apr. 15, 2014.

(51) Int. Cl.
| | |
|---|---|
| B32B 13/12 | (2006.01) |
| B32B 27/38 | (2006.01) |
| B05D 1/36 | (2006.01) |
| C09D 5/18 | (2006.01) |
| C09D 163/00 | (2006.01) |
| C08G 59/50 | (2006.01) |

(52) U.S. Cl.
CPC .......... *C09D 5/18* (2013.01); *C08G 59/5006* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 4,179,535 A | 12/1979 | Kalbskopf et al. | |
| 4,212,909 A | 7/1980 | Brown | |
| 5,087,647 A * | 2/1992 | Flakus | C09D 163/00 523/412 |
| 6,309,740 B1 * | 10/2001 | Shu | C04B 14/208 252/605 |
| 6,730,148 B2 | 5/2004 | Kondo | |
| 8,921,481 B2 | 12/2014 | Park et al. | |
| 2002/0061940 A1 * | 5/2002 | Lach | C08F 220/18 523/160 |
| 2006/0178463 A1 * | 8/2006 | Sacks | C08K 3/36 524/444 |
| 2007/0148357 A1 * | 6/2007 | Joecken | C09D 5/02 427/407.1 |
| 2009/0214791 A1 * | 8/2009 | Evanson | C04B 41/009 427/294 |
| 2015/0218412 A1 * | 8/2015 | Kreh | C09D 163/00 523/400 |

FOREIGN PATENT DOCUMENTS

WO    WO 00/22016 A1 *   4/2000   ............ C08F 218/10

OTHER PUBLICATIONS

2007. Concrete. Hawley's Condensed Chemical Dictionary. 325-326.*
PCT International Search Report and Written Opinion for PCT/US2015/025982 dated Aug. 12, 2015.
U.S. Appl. No. 61/979,802, filed Apr. 15, 2014.

* cited by examiner

*Primary Examiner* — Michael J Feely
(74) *Attorney, Agent, or Firm* — McCarter & English, LLP

(57) ABSTRACT

The present disclosure relates to coating compositions, kits, and methods of applying the same, for use with fireproofing materials. The coating compositions are effective to control the drying rate and shrinkage of fireproofing materials. The coating compositions are also able to be applied to fireproofing materials shortly after these materials have been applied to a substrate.

11 Claims, 1 Drawing Sheet

WATER-BASED EPOXY FORMULATIONS FOR APPLIED FIREPROOFING

CROSS REFERENCE TO RELATED APPLICATIONS

This application claims priority benefit under 35 U.S.C. §119 (e) from provisional patent application Ser. No. 61/979,802, filed on Apr. 15, 2014. The entire content of the foregoing provisional patent application is incorporated herein by reference.

FIELD OF THE TECHNOLOGY

The present disclosure relates to coating compositions, kits and methods of applying the same, for use with fireproofing materials.

BACKGROUND

In the construction industry, structures can be coated with passive fireproofing material. Fireproofing material is known to provide fire resistance to steel elements of buildings. These materials usually consist of inorganic binders such as plaster or Portland cement, and various fillers such as vermiculite, mica, calcium silicate, gypsum, lightweight polystyrene beads, mineral wool, glass fibers, ceramic fibers, aluminum ore, clay and quartz. Examples of plaster-based fireproofing products are Cafco® 300 from Isolatek International, Pyrolite® 15 from Carboline and Monokote® MK-6 from W. R. Grace. Examples of Portland-cement-based fireproofing products are Fendolite® MII from Isolatek International, Pyrocrete® 241 from Carboline and Monokote® Type Z-146 from W. R. Grace.

Passive fireproofing materials, once applied, are often coated. The coatings can provide additional durability, particularly against negative effects caused by corrosive chemicals or the ingress of water from rain, washing and salt water. Physical degradation from freeze-thaw cycles is an example of such a negative effect. It is common in the industry to use a non-aqueous (i.e., organic based) sealant as the coating. These organic based coatings can act as a sealant and/or a top-primer for subsequent application of other protective or decorative coatings, such as paint. An example of an organic based sealant is Carboguard® 1340.

It is beneficial to apply the coating soon after the fireproofing material has been applied to a substrate. Application of the coating within a few days or a few hours can reduce the cost of scaffolding or other construction support. Once the fireproofing material has been coated, these construction supports can be removed. The ability for construction to progress without the delay of waiting for the coating to be applied can reduce rental costs and free the area for other uses. Prompt coating can also reduce the rate of early drying. It can also allow for good curing and strength development, particularly in hot and/or dry conditions.

In most applications, it is beneficial for the coating to uniformly coat the fireproofing material. Applied fireproofing can be thick (e.g., 1-2 inches or more) and can initially contain substantial water (e.g., 30-70%). Depending on environmental conditions, applied fireproofing can require a number of days for curing. Coatings, such as Carboguard® 1340, do not provide a sufficiently uniform coating when applied soon after the fireproofing material has been applied. Due to the high water content, the non-aqueous and hydrophilic liquid tends to pool or bead up when applied which results in a spotty, non-uniform coating. Accordingly, this non-uniform coating can then fail to provide the desired enhancement of durability and/or reduction of early drying rates.

The present disclosure relates to coating compositions, kits, and methods of applying the same, for use with fireproofing materials. The coating compositions are effective to control the drying rate and shrinkage of fireproofing materials. They are also able to be applied to fireproofing materials shortly after these materials have been applied to a substrate.

SUMMARY

The present disclosure relates to coating compositions, kits, and methods of applying the same, for use with fireproofing materials.

In one embodiment, the present disclosure relates to a method of coating a fireproofing material including applying a coating composition to the fireproofing material, wherein the fireproofing material has a water content of at least about 20 wt %, and wherein the coating composition forms a uniform coating on the fireproofing material.

In another embodiment, the present disclosure relates to a method of coating a fireproofing material including applying a coating composition to the fireproofing material within one (1) hour after the fireproofing material is applied to a substrate, wherein the coating composition forms a uniform coating on the fireproofing material.

In another embodiment, the present disclosure relates to a water-based epoxy coating composition comprising an epoxy resin, a polyamine, and water.

In another embodiment, the present disclosure relates to a composition comprising a first layer including fireproofing material, and a second layer including a water-based epoxy coating composition. The fireproofing material in the composition can have a water content of at least about 20 wt %. The water-based epoxy coating in the composition can form a uniform coating on the fireproofing material.

In another embodiment, the present disclosure relates to a kit for preparing a coating composition comprising a first solution having an epoxy resin, and a second solution having a polyamine, wherein one or both of the solutions contain water.

BRIEF DESCRIPTION OF THE DRAWINGS

FIG. 1 shows the interface of the substrate and fireproofing protected by caulk without a non-polar water-based epoxy sealant underneath.

FIG. 2 shows the interface protected by caulk with a non-polar water-based epoxy sealant applied prior to and underneath the caulk.

DETAILED DESCRIPTION

Figure 1:
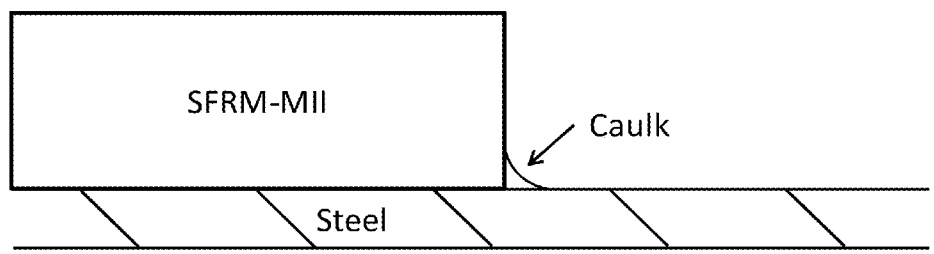
FIGS. 1 and 2 show an exemplary embodiment of the present invention. These figures show a substrate with fireproofing applied.

The present disclosure relates to coating compositions, kits, and methods of applying the same, for use with fireproofing materials. One object of the present disclosure is to reduce the rate of drying and shrinkage in spray-applied fireproofing, in particular fireproofing containing lightweight aggregate and binders (e.g., plaster or cement). By slowing the drying rate, the strength of the fireproofing material can be increased. Similarly, by slowing the shrinkage rate, the potential for cracking can be reduced.

Surprisingly, it has been found that water-based epoxy coatings can be applied very soon after the wet fireproofing has been applied. It was anticipated that a water-based epoxy formulation might fail to provide an effective coating on substantially-wet fireproofing due to dilution by the water in the fireproofing, thus impairing the amine/epoxy reaction necessary to form a coating. It was also anticipated that the hydrophilic nature of a water-based epoxy coating might provide too much water-permeation and fail to provide the desired retardation of drying and protection against water ingress. The coating compositions (e.g., water-based epoxy formulations) of the present disclosure form uniform and effective coatings which are not substantially affected by water permeation.

Water based sealants, such as Carboguard® 1340 WB, are known. As described in the Carboguard® 1340 WB product data sheet, however, Carboguard® 1340 WB is indicated for use only with concrete. It is not described as useful or applicable to fireproofing. In addition, Carboguard® 1340 WB is indicated for use only after 28 days after new concrete has been poured and cured. It is not described as useful or applicable to wet and/or uncured concrete or fireproofing.

As used herein, the term "drying rate" or "drying time" refers to the time it takes for an applied fireproofing to dry from its original or applied water content (e.g., 50 wt % water) to its nominal or resting water content (e.g., 5 wt % water).

As used herein, the term "shrinkage" or "shrinkage rate" refers to the rate of decrease in the length of material in one or more directions during drying/curing, thereby causing a reduction in the rate of volume decrease.

In one embodiment, the present disclosure relates to a method of coating a fireproofing material including applying a coating composition to the fireproofing material, wherein the fireproofing material has a water content of at least about 20 wt %, and wherein the coating composition forms a uniform coating on the fireproof material.

The fireproofing material can be known fireproofing material used in construction. The material can include one or more inorganic binders, such as plaster and Portland cement. The material can also include one or more fillers, such as vermiculite, mica, calcium silicate, gypsum, lightweight polystyrene beads, mineral wool, glass fibers, ceramic fibers, aluminum ore, clay and quartz. The fireproofing material can include plaster-based fireproofing products, such as Cafco® 300, Pyrolite® 15 and Monokote® MK-6, and Portland-cement-based fireproofing products, such as Fendolite® MII, Pyrocrete® 241 and Monokote® Type Z-146.

The coating composition can be applied by known methods used for the application of sealants and topcoats to fireproofing materials. Common methods of application include by spray, roller or brush. In particular, the coating composition is sprayed onto the fireproofing material.

The coating composition can be epoxy based. The coating can contain an epoxy resin and an hardener. The epoxy resin can be selected from known epoxy resins. The epoxy resin can be a polyepoxide compound containing at least two epoxy groups. It can be saturated or unsaturated, aliphatic, cyclo aliphatic, aromatic or heterocyclic and can be substituted. The epoxy resin can be monomeric or polymeric.

In one embodiment, the epoxy resin can be a diepoxide. Diepoxide as used herein refers to an epoxide compound or mixture of epoxide compounds wherein at least one of the compounds contains two epoxy groups. The epoxy resin can be a liquid at a temperature in a range from 10° C. to less than 50° C. Examples of aliphatic forms of the epoxy resin include trimethylpropane epoxide, and diglycidyl-1,2-cyclohexane dicarboxylate.

Other examples of the epoxy resin can include, for example, the glycidyl ethers of polyhydric phenols or epoxy resins prepared from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated bisphenols, trisphenols, phenol-aldehyde resins, novolac resins (i.e., the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

Additional examples of the epoxy resin can include the diglycidyl ethers of resorcinol, catechol, hydroquinone, bisphenol, bisphenol A, bisphenol AP (1,1-bis(4-hydroxyphenyl)-1-phenyl ethane), bisphenol F, bisphenol, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or a combination thereof. In one embodiment, the epoxy resin is a bisphenol A diglycidyl ether.

Examples of bisphenol A based epoxy resins can include commercially available epoxy resins such as D.E.R.™ 300 series (e.g., D.E.R.™ 383) and D.E.R.™ 600 series, commercially available from The Dow Chemical Company. Examples of epoxy novolac resins can include commercially available resins such as D.E.N.™ 400 series, commercially available from The Dow Chemical Company.

In particular, the epoxy resin component of the composition can include diglycidyl ether of bisphenol A from about 70 to about 97 wt %, or about 75 to about 96 wt %, or about 80 to about 95 wt % and a solvent (e.g., an alkyl glycidyl ether) from about 3 to about 30 wt %, or about 4 to about 25 wt %, or from about 5 to about 20 wt %. For example, the epoxy resin component can be ISOLA-GUARD WB 500™ (Part A).

The physical/chemical characteristics of ISOLA-GUARD WB 500™ (Part A) include Boiling Point (° F.): >300, Weight % Solids 100, Vapor Density (Air=1): <1, VOC: <0.19 lb./gal, Specific Gravity (water=1): 1.10-1.15, Evaporation Rate: Slower than N-Butyl acetate, Appearance and Odor: Amber liquid, mild odor, Physical State: Liquid, Flash Point (Method used): >350° F. (Setaflash closed cup), Reactivity Stability: Stable, Incompatibility (Material to Avoid): Strong oxidizing agents, Hazardous Decomposition Products: $CO$, $CO_2$, Hazardous Polymerization: Will not occur by itself. Mixing masses over one pound with aliphatic amine can cause heat buildup, and Conditions to Avoid: Mixture with or exposure to strongly acidic or basic materials.

The hardener can be selected from known hardeners. Examples of hardeners, or curative compounds, include formaldehyde hardeners and polyamine hardeners. Formaldehyde hardeners include phenol-formaldehyde, resorcinol-formaldehyde, catechol-formaldehyde, hydroquinone-formaldehyde, cresol-formaldehyde, phloroglucinol-formaldehyde, pyrogallol-formaldehyde, melamine-formaldehyde, urea-formaldehyde, and blends or derivatives thereof. Polyamine hardeners include aliphatic or alicyclic polyamines, such as ethylenediamine (EDA), diethylenetriamine (DETA), triethylenetetramine (TETA), tetraethylenepentamine (TEPA), polyoxypropylenediamine, polyoxypropylenetriamine, isophorone diamine, menthane diamine, bis (4-amino-3-methyldicyclohexyl)methane and blends or derivatives thereof.

The hardener can also contain one or more linear or branched polyalkylene polyamines. The polyalkylene polyamine can have three or more amine hydrogens per molecule, up to as many as 10 or more. The alkylene groups each can contain from 2 to 8 carbons, preferably from 2 to 6 carbons, and can be linear or branched. The polyalkylene polyamines can have amine hydrogen equivalent weights as low as about 20 to as much as 50. The molecular weight of the polyalkylene polyamine can be up to 500, preferably up to 200. The polyalkylene polyamine can contain one or more tertiary amino groups. These polyalkylene amines can include, for example, diethylene triamine, triethylene diamine, tetraethylenepentamine, higher polyethylene polyamines, N',N'-bis(2-aminoethyl)ethane-1,2-diamine, 2-methylpentane-1,5-diamine and blends or derivatives thereof.

Additional examples of hardeners include diaminocyclohexane, aminoethylpiperazine, dicyandiamide, phenylene diamine (particularly the meta-isomer), methylene dianiline, bis(4-amino-3,5-dimethylphenyl)-1,4-diisopropylbenzene, bis(4-amino-phenyl)1,4-diospropylbenzene, mixtures of methylene dianiline and polymethylene polyaniline compounds (sometimes referred to as PMDA, including commercially available products such as DL-50 from Air Products and Chemicals, Inc.), diethyltoluenediisocyanate, methylene bis(cyclohexylamine), 1,2-, 1,3- and/or 1,4-bis (aminomethyl)cyclohexane, 2- and/or 4-alkylcyclohexane-1,3-diamine, diaminodiphenylsulfone and amine-epoxy resin adducts such as are commercially available as D.E.H.™ 52 from The Dow Chemical Company.

The hardener can also contain an amido-amine, such as those where some or all of the amine nitrogen atoms are instead amides. These can be the equivalent to that obtained through the reaction of a "fatty acid" with one or more amine nitrogen atoms. These fatty acids can contain 8-24 carbon atoms and can contain one or more carboxyl group. The amines can be derived from aliphatic polyamines such as ethylenediamine, diethylenetriamine, triethylenetetramine, tetraethylenepentamine and the like. Commercially-available examples are Anquamine 401 and Anquamine 701, sold by Air Products and Chemicals, Inc.

In some embodiments, zinc lower alkyl dithiocarbamate accelerators can be used as the primary accelerator. These materials are commercially available in association with zinc in salt form, namely zinc dibutyl dithiocarbamate, zinc diethyl dithiocarbamate, zinc dimethyl dithiocarbamate and zinc diamyl dithiocarbamate. In the absence of a primary accelerator, higher levels of secondary accelerators can be used.

In particular, the hardener component of the composition can be an aqueous solution which includes a polyamine polymer from about 5 to about 25 wt %, or about 7.5 to about 20 wt %, or about 10 to about 15 wt % and a solvent (e.g., a tetraethylene pentamine) at less than or equal to about 3 wt %, 2 wt % or 1 wt %. For example, the epoxy resin component can be ISOLA-GUARD WB 500™ (Part B).

The physical/chemical characteristics of ISOLA-GUARD WB 500™ (Part B) include Boiling Point (° F.): >212° F., 100° C., Weight % Solids 70, VOC: <0.16 lb./gal, Specific Gravity (water=1): 1.30-1.45, Evaporation Rate: Slower than N-Butyl Acetatem, Appearance and Odor: Gray-tan liquid, mild ammoniacal odor, Physical State: Aqueous dispersion, Reactivity Stability: Stable, Incompatibility (Material to Avoid): Strong oxidizing agents, Hazardous Decomposition Products: CO, $CO_2$, Nox, ammonia, Hazardous Polymerization: Will not occur by itself. Mixing masses over one pound with epoxy compounds can cause heat buildup and Conditions to Avoid: Mixture with or exposure to strongly acidic materials.

Water can also be present in the epoxy and/or hardener part of the composition. The epoxy and/or hardener parts can include surfactants or appropriate chemical modifications to provide water compatibility.

In another embodiment, the present disclosure relates to a water-based epoxy coating composition comprising an epoxy resin, such as an bisphenol A based epoxy resin, and a hardener, such as an aliphatic polyamine component, and water. In a further embodiment, the present disclosure relates to a composition comprising a first layer including fireproofing material, and a second layer including a water-based epoxy coating composition.

The ratio of epoxy resin to hardener in the coating composition can vary depending on the characteristics of the epoxy desired. The ratio of epoxy resin to hardener in the coating composition can range from 1:99 to 99:1. In particular, the ratio of epoxy resin to hardener in the coating composition can range from 1:10 to 10:1, or more particularly from 1:5 to 5:1.

The amount of epoxy resin and hardener in the coating composition can also vary depending on the desired characteristics. In some embodiments, the amount of epoxy resin in the coating composition can range from about 5 wt % to about 70 wt %, and in particular from about 10 wt % to about 60 wt %. In other embodiments, the amount of hardener in the coating composition can range from about 5 wt % to about 70 wt %, and in particular from about 10 wt % to about 60 wt %. In some embodiments, the epoxy to hardener ratio and other such amounts as provided herein refer to the epoxy and hardener themselves. In other embodiments, the epoxy to hardener ration and other such amounts refer to the epoxy and hardener components, which may comprise other materials, solvents, pigments, etc.

The coating composition can be aqueous or semi-aqueous based. In one embodiment, the composition can have a water content between about 10 wt % and about 90 wt %. In particular, the water content can be between about 10 wt % and about 80 wt %, or about 30 wt % and about 70 wt %. In one embodiment, the present disclosure relates to a water-based epoxy composition for coating over cement-based or plaster-based fireproofing, wherein the water content of the water-based epoxy composition is between about 10 wt % and about 90 wt %.

Additional components can also be contained in the coating composition. These additional components can include inorganic fillers, titanium oxide, clay, zinc oxide, barium sulfate, limestone, dolomite, talc, carbon black, silica, mica, wollastinite, quartz, microsperes, and combinations thereof. In some embodiments, the additional components are non-polar, or substantially non-polar. In these embodiments, other polar groups, such as oxygen, are avoided. In other embodiments, the present disclosure relates to a water-based composition wherein the reactive components contain no oxygen atoms, other those provided by the epoxy functionality. As provided by the epoxy functionality, the oxygen-containing components are in the form of either ether, hydroxyl or epoxide oxygens. In some embodiments, the composition can contain components with oxygen atoms in addition to those provided by the epoxy functionality. These additional components can be in the form of ether, hydroxyl or epoxide oxygens.

In one embodiment, the present disclosure relates to a water-based composition containing at least 10 wt % inorganic fillers. In another embodiment, the present disclosure relates to a water-based composition containing at least 5 wt % titanium dioxide. In another embodiment, the present disclosure relates to a water-based composition containing at least 5 wt % clay. The present disclosure can contain other components including defoamers, thickeners, wetting agents, surfactants, anti-settling agents, pigments, dyes, corrosion inhibitors, accelerants such as zinc oxide, acids, phosphites or tertiary amines, solvents such as ethylene glycol, butyl ether, coalescents such as Texanol™ by Eastman or Solusolv™ 2075 by Solutia and additional resins such as vinyl and acrylic polymers.

The coating composition of the present disclosure can also contain dyes or pigments. The presence of dyes and pigments can assist in the application of a uniform coating. While the coating composition is applied, the color of the coating composition can be observed to ensure an appropriate and uniform coating is applied. The color of an appropriate coating can vary based, in part, on the concentration of dye used and the thickness of the desired coating. A particular embodiment is a color, which when dry, matches the un-coated color of the fireproofing, such that any minor future damage does not present an objectionable appearance.

The coating composition can be applied onto an applied fireproofing material having a high water content. The coating composition can provide an effective coating when applied to a damp and/or wet fireproofing surface. The coating composition is not impaired by any dilution that may occur by the water in the surface layers of the fireproofing material. The coating composition can be applied to an applied fireproofing material having at least about 20 wt % water. In particular, the coating composition can be applied to an applied fireproofing material having at least about 20 wt %, or about 25 wt %, or about 30 wt %, or about 35 wt %, or about 40 wt %, or about 50 wt %, or about 60 wt %, or about 70 wt % water. While the coatings are water based, once cured, they provide sufficient resistance to water permeation and the necessary retardation to allow sufficient drying and concomitant reduction in the rate of shrinkage.

Where applied, the coating composition can form a uniform coating on the fireproofing material. A uniform coating can include the following; no coating-free portions of the material, each portion of the coating having substantially the same thickness, all of the components of the coating composition evenly dispersed in the coating, and/or the coating performs (e.g., protects, supports, reduces) substantially the same across the coated fireproofing material.

In another embodiment, the present disclosure relates to a method of coating a fireproofing material including applying a coating composition to the fireproofing material within 1 hour after the fireproofing material is applied to a substrate, wherein the coating composition forms a uniform coating on the fireproofing material. Typically, a long or extended amount of time must be passed before a coating can be applied to fireproofing. The need for an extended time is, in part, because the applied fireproofing has a high water content (e.g., damp surface) and non-aqueous coating compositions are incompatible with damp surfaces. The application of such a non-aqueous coating composition to a damp fireproofing surface results in non-uniform coating.

Typically, the water content of an applied fireproofing material is highest directly after application to a substrate. The coating composition can also be applied to an applied fireproofing at an early stage of dryness, such as within about 1 hour after the fireproof material is applied to the substrate. Because the coating composition is aqueous or semi-aqueous based, the coating composition forms a uniform coating on the applied fireproofing. In particular, the coating composition can be applied to an applied fireproofing within about 192 hours, or about 168 hours, or about 120 hours, or about 96 hours, or about 80 hours, or about 72 hours, or about 50 hours, or about 48 hours, or about 40 hours, or about 36 hours, or about 24 hours, or about 16 hours, or about 12 hours, or about 8 hours, or about 6 hours, or about 4 hours, or about 2 hours, or about 1 hour after the fireproof material is applied to the substrate. The coating composition can be applied within a time window based on any of these times, such as for example, between about 1 hour and about 80 hours, or any combination as provided. In one embodiment, the present disclosure relates to a water-based composition wherein the coating is applied within 8 days from the time that the fireproofing was applied.

The thickness of the coating should be sufficient to provide adequate drying and protection from water ingress, as well as other properties described herein. The thickness of the coating can be measured as the dry film thickness. The dry film thickness can be between about 0.25 and about 10 mils, or about 0.5 and about 8 mils, or about 0.75 and about 6 mils, or about 1 and about 6 mils, or any combination thereof. (1 mil=25 micrometers). In one embodiment, the present disclosure relates to a water-based coating composition generated by the water-based epoxy composition that have a dry film thickness of 0.5-8 mils.

To be applied properly to the fireproofing material, the coating composition should have an appropriate viscosity. In one embodiment, the composition can have a viscosity between about 500 and about 2,000 centipoises as measured on an RVT Brookfield at 23° C., 10 rpm, and spindle 3.

By applying the coating composition of the present disclosure to applied fireproofing, the drying rate and/or the shrinkage rate of applied fireproofing can be controlled (e.g., reduced). An acceptable drying rate is one in which the rate over the first seven days has been reduced, relative to uncoated material, by 10-50% or more particularly by 20-40%. In situations where the drying rate of the applied fireproofing is too fast, the fireproofing material can have reduced strength, effectiveness, longevity, cracking or combinations thereof. Increased drying rates can occur due to dry weather conditions, excessive temperature, sun exposure, high air movement or combinations thereof.

The coating composition of the present disclosure can reduce the drying rate of an applied fireproofing by at least about 10% as compared to the drying rate of an applied fireproofing without the coating composition. In particular, the drying rate can be reduced by at least about 20%, or at least about 30%, or at least about 40%, or at least about 50%, or at least about 60%, or at least about 70%, or at least about 80%, or at least about 90% as compared to the drying rate of an applied fireproofing without the coating composition.

The drying rate can be measured on a weekly basis. In one embodiment, the coating composition can provide a coating that reduces the rate of drying over the first week by at least about 5%, or by at least about 10%, or by at least about 15%, or by at least about 20%, or by at least about 30%, or by at least about 40%, or by at least about 50%, or by any ranges of these values (e.g., 10-50% or 20-40%).

An acceptable shrinkage rate is one in which the rate during the first week of drying is less than 80% of the rate without the coating, or more particularly less than 60% of the rate without the coating. In situations where the shrinkage rate of the applied fireproofing is too fast, the fireproofing material can form cracks and can have reduced strength, effectiveness, longevity or combinations thereof. Increased shrinkage rates can occur due to dry weather conditions, excessive temperature, wind, sun exposure or combinations thereof.

The coating composition of the present disclosure can reduce the shrinkage rate of an applied fireproofing by at least about 10% as compared to the shrinkage rate of an applied fireproofing without the coating composition. In particular, the shrinkage rate can be reduced by at least about 20%, or at least about 30%, or at least about 40%, or at least about 50%, or at least about 60%, or at least about 70%, or at least about 80%, or at least about 90% as compared to the shrinkage rate of an applied fireproofing without the coating composition.

In addition to drying rates and shrinking rates, the coating composition of the present disclosure can prevent or reduce water ingress through the coating. For example, the coating composition can reduce the water penetration into the fireproofing material by at least about 5%, or by at least about 10%, or by at least about 15%, or by at least about 20%, or by at least about 30%, or by at least about 40%, or by at least about 50%, or by any ranges of these values, as compared to untreated fireproofing.

In particular, the application method of ISOLA-GUARD WB 500™, as an embodiment of the present disclosure, is described. ISOLA-GUARD WB 500™ is a high-performance, two part water-based epoxy coating which can function as a curing agent, water repellent and penetrating primer when applied with, or directly over, Isolatek's Cafco® Fendolite® M-II, Cafco® Fendolite® TG or Cafco® Fendolite® M-II/P cement based fire protection system after the fireproofing's application.

SUBSTRATE PREP: Surface should be clean and free of any dust or loose material to ensure proper adhesion. Remove any and all traces of oil, grease, dirt, dust, biological mold or mildew or conditions likely to impair adhesion of ISOLA-GUARD WB 500™ can be performed.

MIXING: The product can be supplied in two component pre-measured containers. The mix ratio by volume can be about 3:1 (Part B to A) as supplied. For Part B: Part B can be pre-mixed with a paint-style drill mixer to ensure any settled material is dispersed. for Part A, all of Part A and Part B can be added together and mixed thoroughly with a paint-style drill mixer for a short time, e.g., 3 minutes. If crystallization is present in the Part A component, Part A can be heated to about 100° F. (38° C.) for a short time, e.g., 30 minutes, or until crystallization is no longer present. Crystallization is a partial solidification of the liquid with a gritty feel and appearance. In some embodiments, the components should not be thinned. They can be mixed until a uniform color is consistent throughout the mixture.

APPLICATION EQUIPMENT: Spray: A Graco 1595 or equivalent, capable of maintaining high pressure, e.g., 3000 psi (1.25 gpm), with a filter, e.g., 60 mesh, in the pump can be used. In particular, a 50' of ⅜" I.D. hose and a maximum of 6' of Y4" I.D. whip hose can be used. A Graco HD Texture Plus Spray Gun Model #241-705 or equivalent with the diffuser tip removed can also be used. The tip size can be 0.019", or similar, with the diffuser removed. Brush: A soft/medium synthetic bristle brush can be used. Roller: A 3/16" smooth finish nap roller can be used.

APPLICATION THICKNESS: A minimum of 24 hours can be allowed after the application of Cafco® Fendolite® M-II or Fendolite® M-II/P. Wet Film Thickness (WFT): an average WFT of about 3.0 to 5.0 mils (0.08 to 0.13 mm) can be applied in a single coat. If drips or sagging occurs, these should be spread into uncoated areas. Dry Film Thickness (DFT): an average DFT of about 1.5 to 2.5 mils (0.04 to 0.07 mm) can be applied.

APPLICATION TEMPERATURE: The product can be applied when the ambient air temperature is between 50° F. (10° C.) and 100° F. (38° C.). A minimum substrate and ambient temperature of 50° F. (10° C.) can be maintained prior to, during, and the minimum hours after application, e.g., 24 hours.

CLEAN UP: Clean up for all equipment and supplies should be done within a short time (e.g., 10 minutes) after the pot life has expired (e.g., 1-3 hours, 1-2 hours, 1 hour, etc., depending on the formulation). The materials can cure or set-up and clog or damage equipment in a short time, e.g. 10 minutes. In some embodiments, equipment and supplies are cleaned of the materials within 10 minutes after use.

SOLIDS CONTENT: The solids content of the applied material can be about 40 to about 80 wt %, in particular about 62% (±2% by weight)

In some embodiments, the present disclosure relates to a kit having a Part A component (e.g., about 9.5 lbs, 1 gallon) and a Part B component (e.g., 35.5 lbs., 3.1 gallons). The kit can be stored in a dry environment with temperatures between 50° F.-100° F. (10° C.-38° C.), and can be protected against strong radiant sunlight during transportation and storage.

In some embodiments, a further latex coating can be applied over the coating composition on the fireproofing material. The latex coating can contain polymers or copolymers based on esters of acrylic acid or vinyl alcohol. In one embodiment, the latex coating can be applied to the coated, applied fireproofing within 1 days of the application of the coating composition. In particular, the latex coating can be applied to the coated, applied fireproofing within 2 days, or about 4 days, or about 7 days, or about 10 days, or about 14 days, or about 21 days, or about 28 days, or about 30 days of the application of the coating composition.

In other embodiments, a further caulk coating can be applied over the coating composition on the fireproofing material. The caulk can be comprised of silicone, polyurethane, polysulfide, polyacrylic polymers or copolymers as well as other caulks known by those skilled in the art. In one embodiment, the caulk coating can be applied to the coated, applied fireproofing within 4 hours, or about 1 day, or about 2 days, or about 4 days, or about 7 days, or about 14 days, or about 21 days, or about 28 days of the application of the coating composition.

Caulk is often applied to seal joints or seams between two or more different materials. Caulk can be used to seal the interface between the substrate and the fireproofing. It can be applied at points where the fireproofing ends on the substrate. The substrates can include steel, galvanized steel and the like. The substrates can also be coated with an appropriate primer as known to those skilled in the art. In some instances, the caulk prevents or reduces liquids, most notably water, from penetrating into the fireproofing/substrate interface. The application of the coating composition of the present disclosure prior to the application of caulk can greatly reduce liquid ingress at the interface, as well as increase the bond between the caulk and the fireproofing.

Figure 2:
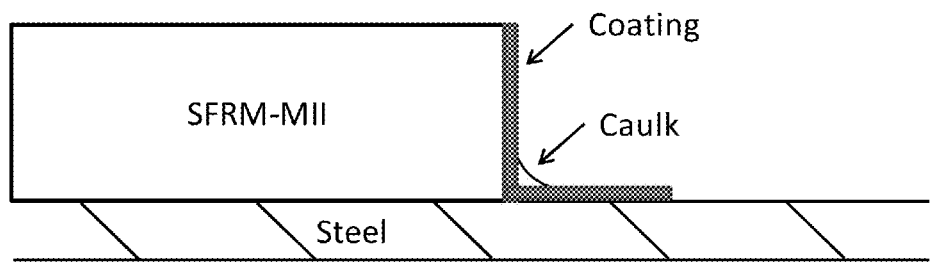

FIGS. 1 and 2 show an exemplary embodiment of the present invention. FIG. 1 shows a substrate with fireproofing applied. The interface is protected by caulk applied to the interface of the substrate and the fireproofing. FIG. 2 shows a substrate with fireproofing applied. The area at the interface is coated with a composition of the present invention prior to the application of caulk to the interface of the substrate and the fireproofing.

In another embodiment, the present disclosure relates to a kit for preparing a coating composition comprising a first solution having an epoxy resin, such as a bisphenol A based epoxy resin, and a second aqueous solution having a hardener, such as an aliphatic polyamine.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1—Fireproofing Material

A fireproofing material was applied to a series of steel plates. A 50 bag of Fendolite® MII (Isolatek International) was mixed with 40 pounds of potable water using a paddle mixer. This mixture was then sprayed onto 12"×12" steel plates to a wet thickness of 1.5 inches. These plates having an applied fireproofing material were used to test different coating compositions.

Example 2—Non-Polar Water-Based Epoxy Sealant

A non-polar water-based epoxy sealant was prepared.
PART A: In a steel cup, the following components were mixed:

| Component | Amount | Wt % | Supplier/Description |
|---|---|---|---|
| Epon 828 | 34.72 g | 15.1% | Momentive/Epoxy resin |
| WD-510 | 103.23 g | 44.9% | Momentive/Water-based epoxy resin |
| GE-8 | 92.1 g | 40.0% | Emerald/C12-C14 Glycidyl Ether Aliphatic Monofunctional Epoxy/Reactive Diluent to decrease viscosity |
| | 230.05 g | 100% | |

PART B: In a steel cup, the following components were mixed:

| Component | Amount | Wt % | Supplier/Description |
|---|---|---|---|
| Water | 260 g | 34.46% | Carrier |
| Kelzan AR | 0.7 g | 0.09% | CPKelco/Thickener |
| Anquamine 401 | 155.6 g | 20.62% | Air Products and Chemicals, Inc./Hardener |
| BYK-034 | 2.86 g | 0.34% | BYK USA, Inc./Defoamer |
| Carbowet 109 | 7.21 g | 0.96% | Air Products and Chemicals, Inc./Surfactant |
| Kronos 2300 | 104.2 g | 13.81% | Kronos/White Pigment |
| Zinc Oxide | 36.34 g | 4.82% | U.S. Zinc/Reaction rate modifier |
| Cimbar 325 | 182 g | 24.12% | Cimbar/Barium Sulfate Filler |
| Aurosperse W-1025 | 5 g | 0.66% | BASF/Yellow Pigment |
| Fornblak Jet N32 | 0.67 g | 0.09% | Color Mate, Inc./Black Pigment |
| | 754.58 g | 100% | |

Parts A and B were mixed together and used to coat the fireproofing material from Example 1. The mixture was applied by brush to yield a uniform coating with a dry film thickness of 2 or 4 mils.

Example 3—Non-Water-Based, Non-Polar Sealant: Carboguard® 1340

A commercial non-water-based epoxy sealant, Carboguard® 1340, was used to coat the fireproofing material from Example 1. The sealant was applied by brush to a dry film thickness of 2-4 mils. Coatings applied at 24 hours were "spotty" due to pooling of the non-water-based material on the wet/damp surface.

Example 4—Polar Water-Based Epoxy Sealant

A polar water-based epoxy sealant was prepared.
PART A: In a steel cup, the following components were mixed:

| Component | Amount | Wt % | Supplier/Description |
|---|---|---|---|
| Epon 828 | 24 g | 13.91% | Momentive/Epoxy resin |
| WD-510 | 42.5 g | 24.64% | Momentive/Water-based epoxy resin |
| DER-732 | 28.5 g | 16.52% | Dow Chemical/Polar epoxy resin |
| Carbowet 109 | 2.5 g | 1.45% | Air Products and Chemicals, Inc./Surfactant |
| Kronos 2300 | 75.0 g | 43.48% | Kronos, Inc./White Pigment |
| | 172.5 g | 100% | |

PART B: In a steel cup, the following components were mixed:

| Component | Amount | Wt % | Supplier/Description |
|---|---|---|---|
| Water | 186 g | 49.53% | Carrier |
| Kelzan AR | 1.24 g | 0.33% | CPKelco/Thickener |
| Anquamine 401 | 55.8 g | 14.86% | Air Products and Chemicals, Inc./Hardener |
| Dysperbyk 190 | 3.1 g | 0.83% | BYK USA, Inc./Dispersant |
| BYK-034 | 1.24 g | 0.33% | BYK USA, Inc./Defoamer |
| Carbowet 109 | 1.9 g | 0.51% | Air Products and Chemicals, Inc./Surfactant |
| Kronos 2300 | 68.2 g | 18.16% | Kronos, Inc./White Pigment |

-continued

| Component | Amount | Wt % | Supplier/Description |
|---|---|---|---|
| Jeffamine D400 | 55.8 g | 14.86% | Huntsman Corp./Polar Hardener |
| Aurosperse W-1025 | 2 g | 0.53% | BASF/Yellow Pigment |
| Formblak Jet N32 | 0.25 g | 0.07% | Color Mate, Inc./Black Pigment |
| | 375.53 g | 100% | |

Parts A and B were mixed together and used to coat the fireproofing material from Example 1. The mixture was applied by brush to yield a uniform coating with a dry film thickness of 2 or 4 mils.

Example 5—Water-Based Latex Topcoat

A water-based latex topcoat was prepared. In a steel cup, the following components were mixed:

| Component | Amount | Wt % | Supplier/Description |
|---|---|---|---|
| Water | 13.56 g | 6.20% | Carrier |
| Celvolit 2416 | 40 g | 18.27% | Celanese/Water-based resin |
| Dysperbyk 190 | 1.8 g | 0.82% | BYK USA, Inc./Dispersant |
| BYK-034 | 0.2 g | 0.09% | BYK USA, Inc./Defoamer |
| Carbowet 109 | 0.6 g | 0.27% | Air Products and Chemicals, Inc./Surfactant |
| Kronos 2300 | 18 g | 8.22% | Kronos, Inc./White Pigment |
| Allen G | 36 g | 16.45% | IMERYS/Clay filler |
| Zinc Oxide | 6.6 g | 3.02% | U.S. Zinc, Reaction rate modifier |
| Aurosperse W-1025 | 1 g | 0.53% | BASF/Yellow Pigment |
| Formblak Jet N32 | 0.12 g | 0.07% | Color Mate, Inc./Black Pigment |
| Celvolit 2416 | 76 g | 34.56% | Celanese/Water-based resin |
| Solusolv 2075 | 6 g | 2.73% | Solutia, Inc./Coalescent |
| Water | 20 g | 9.10% | Carrier |
| | 219.88 g | 100% | |

The latex topcoat was used to coat the fireproofing material from Example 1.

Example 6—Drying Study

The coated plates from Examples 2-5 were tested in a drying study. The respective coatings were applied in various dry film thicknesses (dft) and at various times (time) after the fireproofing was applied. The dft was calculated for the 12"×12" area and did not account for any surface roughness. The 7-day water loss was measured. The water loss was determined relative the fireproofing without any sealant (none). Each sample was dried at about 73-75° F. and about 30-40% relative humidity with minimal air movement. The drying study results are presented below:

| Sealant | dft (mils) | Time (hrs) | 7-day wt loss |
|---|---|---|---|
| None | None | n/a | 100% |
| Non-polar water-based epoxy sealant (Ex 2) | 2.0 | 4 | 79% |
| Non-polar water-based epoxy sealant (Ex 2) | 2.0 | 24 | 72% |
| Non-polar water-based epoxy sealant (Ex 2) | 4.0 | 24 | 65% |
| Carboguard ® 1340 | 2.0 | 24 | 96% |
| Carboguard ® 1340 | 4.0 | 24 | 78% |
| Polar water-based epoxy sealant (Ex 4) | 2.0 | 24 | 92% |
| Polar water-based epoxy sealant (Ex 4) | 4.0 | 24 | 65% |
| Non-polar water-based epoxy sealant (Ex 2) | 2.0 | 72 | 85% |
| Non-polar water-based epoxy sealant (Ex 2) | 4.0 | 72 | 83% |
| Carboguard ® 1340 | 2.0 | 72 | 92% |
| Carboguard ® 1340 | 4.0 | 72 | 86% |
| Polar water-based epoxy sealant (Ex 4) | 2.0 | 72 | 93% |
| Polar water-based epoxy sealant (Ex 4) | 4.0 | 72 | 88% |
| Polar water-based epoxy sealant (Ex 4), then | 2.0 | 72 | |
| 4 hours later water-based latex topcoat (Ex 5) | 2.0 | 76 | 86% |

The target drying rate was between about 70-90% of the non-sealed control. A drying rate between about 70-90% provide a good balance between reducing the early drying rate (to improve curing) without excessive times for complete drying. This study shows that the prior art (e.g., Carboguard® 1340) requires 4 mils to provide the desired reduction in drying rate, compared to only 2 mils required for non-polar, water-based epoxy sealants. Similarly, non-polar, water-based epoxy sealants show better performance vs. polar, water-based epoxy sealants. However, polar, water-based epoxy sealants are useful as a primer over which a topcoat can be applied (i.e., last two lines of Table). For example, a polar, water-based epoxy sealant was used at 2 mils because of its small reduction in drying rates, such that the topcoat can also be applied without significantly slowing down the drying. The same can be achieved with 1 mil of the non-polar, water-based epoxy sealant followed by 2 mils of the latex topcoat.

Example 7—Protection Against Water Ingress Study

The coated plates from Examples 2-5 were tested in a water study. The respective coatings were applied in various dry film thicknesses (dft) and at various times (time) after the fireproofing was applied. The dft was calculated for the 12"×12" area and did not account for any surface roughness. The percent water ingress was measured. Water ingress was determined by spraying water for 3 minutes continuously from a commercial paint sprayer while the dried plate were maintained in a vertical position, so excess water could run off the surface. Water gain was determined relative to the fireproofing without any sealant (none). The ambient conditions during the water spraying was about 73-75° F. and about 30-40% relative humidity with minimal air movement. The water study results are presented below:

| Sealant | dft (mils) | Time (hrs) | 7-day wt loss |
|---|---|---|---|
| None | None | n/a | 100% |
| Non-polar water-based epoxy sealant (Ex 2) | 2.0 | 4 | 79% |
| Non-polar water-based epoxy sealant (Ex 2) | 2.0 | 24 | 72% |

| Sealant | dft (mils) | Time (hrs) | 7-day wt loss |
|---|---|---|---|
| Non-polar water-based epoxy sealant (Ex 2) | 4.0 | 24 | 65% |
| Carboguard ® 1340 | 2.0 | 24 | 96% |
| Carboguard ® 1340 | 4.0 | 24 | 78% |
| Polar water-based epoxy sealant (Ex 4) | 2.0 | 24 | 92% |
| Polar water-based epoxy sealant (Ex 4) | 4.0 | 24 | 65% |
| Non-polar water-based epoxy sealant (Ex 2) | 2.0 | 72 | 85% |
| Non-polar water-based epoxy sealant (Ex 2) | 4.0 | 72 | 83% |
| Carboguard ® 1340 | 2.0 | 72 | 92% |
| Carboguard ® 1340 | 4.0 | 72 | 86% |
| Polar water-based epoxy sealant (Ex 4) | 2.0 | 72 | 93% |
| Polar water-based epoxy sealant (Ex 4) | 4.0 | 72 | 88% |
| Polar water-based epoxy sealant (Ex 4), then | 2.0 | 72 | |
| 4 hours later water-based latex topcoat (Ex 5) | 2.0 | 76 | 86% |

The target water ingress value was less than 20%, and ideally less than 10%. In some embodiments, the present disclosure relates to a coating composition wherein the amount of water penetration during a 3-minute water spray is reduced by more than 80%, or more than 90%, of that in the absence of the coating, for example, the coating generated by the water-based epoxy composition. This study shows that when a coating is applied 24-hours after the fireproofing is sprayed, a non-polar, water-based epoxy sealant reduces water ingress by more than 80% at 2 or 4 mils. The prior art (e.g., Carboguard® 1340) does not.

Example 8—Caulk Study, Water Ingress

A water repellency study was performed to evaluate the effectiveness of an undercoating of the composition of the present disclosure prior to the application of caulk. Water repellency was tested using steel plate samples having a coating of Fendolite® MII on the surface of the steel plate. Samples consisted of 10" by 12" samples (1.5" thick) of M-II on 12" by 12" steel plates. This created a 2" section of steel exposed on one side of each sample. The top and the sides of each sample that are not exposed were covered with 3 coats of paraffin wax to prevent water entering the sample through these surfaces. The only uncoated face of the M-II, the one with the steel plate exposed, was the part of the sample meant to represent a termination point. It was on this face that a bead of caulk and/or non-polar water-based epoxy sealant was applied. Three different sets of samples were prepared. One set of samples were not treated with caulk. A second set of samples were treated with caulk (see FIG. 1). The last set of samples were treated with a non-polar water-based epoxy sealant and then with caulk (see FIG. 2). The formulation for the sealant was listed in example 2. The caulk used in this study was "GE Silicone II* Window & Door 100% Silicone."

These samples were then placed into water containing a water-soluble dye, phenolphthalein. The testing procedure is similar to, and modeled after, the ASTM sorptivity testing standard C1585. Two different exposure times were tested, 45 minutes and 6 hours. After exposure to water, the samples were cut open and cross-sections observed for depth of water penetration using the dye as the marker.

It was observed that in the sample without caulk, at 45 minutes, the water had substantially migrated into the MII, especially along the MII-steel interface. At 45 minutes, the sample with caulk had water ingress in the section above the caulk but water had not migrated to the steel. In the same sample at six hours, the water front had migrated to the MII-steel interface. The samples that had the non-polar water-based epoxy sealant and caulk showed no significant water ingress or migration at 45 minutes. At 6 hours, these samples show minimal signs of water ingress and no water had migrated to the MII-steel interface. These results indicate that the non-polar water-based epoxy sealant and caulk perform much better than caulk alone to stop water ingress at a termination point.

Example 9—Caulk Study, Bonding Strength

The quality and strength of the bond between the caulk and the MII coating as described in Example 8 was tested using MII coated on steel panels. Three sets of samples were again prepared. One set of samples were not coated with caulk, one set of samples were coated with caulk, and a third set of samples were coated with a non-polar water-based epoxy sealant of the present disclosure and caulk on top of the sealant. Samples consisted of 1" thick, 4" by 12" panels of M-II that had been curing/drying for 90 days. Half of the samples were coated as 'dry' samples. The other half of the samples had water sprayed onto the surface to mimic 'wet/day old" M-II. These 'wet' samples were created by adding 10 grams of water to each panel, waiting 5 minutes, adding another 10 grams of water to each panel, waiting 3 minutes and then coated with non-polar water-based epoxy sealant or caulk. 4 mils wet film thickness (2 mils dry film thickness) of a non-polar water-based epoxy sealant was applied to appropriate samples. 45 grams of caulk was applied onto samples listed as 'coated with caulk'. Samples with both non-polar water-based epoxy sealant and caulk were coated with caulk 2 hours after non-polar water-based epoxy sealant was applied. Samples were then left to cure for 7 days before being tested for bond strength. The formulation for the sealant was listed in example 2. The caulk used in this study was "GE Silicone II* Window & Door 100% Silicone."

After allowing sufficient time to fully cure, a bond-strength cap was attached to each panel. Once pulled, the mode of failure was observed. Samples without a coating showed a fracture occurring within the MII coating. Samples with the caulk alone showed a fracture occurring at the caulk-MII interface. This indicates that there is a weak bond between the caulk and the MIL Samples with the non-polar water-based epoxy sealant between the MII and the caulk showed a fracture occurring within the MII indicating a strong bond between the caulk and the non-polar water-based epoxy sealant and between the non-polar water-based epoxy sealant and MIL The presence of the non-polar water-based epoxy sealant between MII and the caulk increased the bond strength to the point where the fracture occurred within the MIT, rather than at the caulk-MII interface. This strength increase makes the caulk coating more robust and able to better withstand physical disruption. The bond strength was increased by an average of about 60% in this study. The 'dry' samples were improved by about 120% whereas 'wet' samples were improved by about 25%. In some embodiments, the present disclosure improves bond strength by about 20%, or about 30%, or about 40%, or about 50%, or about 60%, or about 70%, or about 80%, or about 90%, or about 100%, or about 110%, or about 120% for dry samples, wet samples or an average of these values.

While this disclosure has been particularly shown and described with reference to example embodiments thereof, it will be understood by those skilled in the art that various changes in form and details may be made therein without departing from the scope of the invention encompassed by the appended claims.

I claim:

1. A method of coating comprising
   (i) applying a coating of fireproofing material directly to a substrate, wherein the fireproofing material is a plaster-based or cement-based fireproofing comprising an inorganic binder and aggregate, and wherein the coating of fireproofing material has a water content of at least about 20 wt %;
   (ii) applying a uniform coating of a coating composition directly to the coating of fireproofing material, wherein the coating of a coating composition has a thickness between 1 and 6 mils, and wherein the coating composition is a water-based epoxy composition comprising an epoxy resin, an aliphatic polyamine hardener, and water, and
   (iii) applying a latex coating or caulk coating directly to the coating of a coating composition, wherein the latex coating comprises polymers or copolymers based on esters of acrylic acid or vinyl alcohol, and wherein the caulk composition comprises silicone, polyurethane, polysulfide, polyacrylic polymers or polyacrylic copolymers.

2. The method of claim 1, wherein the coating of fireproofing material has a thickness of 1 inch or more.

3. The method of claim 1, wherein the uniform coating of a coating composition is directly applied to the coating of fireproofing material within 7 days after the fireproofing material is directly applied to the substrate.

4. The method of claim 3, wherein the uniform coating of a coating composition is directly applied to the coating of fireproofing material within 5 days after the fireproofing material is directly applied to the substrate.

5. The method of claim 4, wherein the uniform coating of a coating composition is directly applied to the coating of fireproofing material within 3 days after the fireproofing material is directly applied to the substrate.

6. The method of claim 5, wherein the uniform coating of a coating composition is directly applied to the coating of fireproofing material within 48 hours after the fireproofing material is directly applied to the substrate.

7. The method of claim 6, wherein the uniform coating of a coating composition is directly applied to the coating of fireproofing material within 24 hours after the fireproofing material is directly applied to the substrate.

8. The method of claim 7, wherein the uniform coating of a coating composition is directly applied to the coating of fireproofing material within 8 hours after the fireproofing material is directly applied to the substrate.

9. The method of claim 8, wherein the uniform coating of a coating composition is directly applied to the coating of fireproofing material within 4 hours after the fireproofing material is directly applied to the substrate.

10. The method of claim 9, wherein the uniform coating of a coating composition is directly applied to the coating of fireproofing material within 1 hour after the fireproofing material is directly applied to the substrate.

11. An article produced by the method of claim 1.

* * * * *